United States Patent
Post et al.

(10) Patent No.: US 9,703,700 B2
(45) Date of Patent: Jul. 11, 2017

(54) EFFICIENT BUFFERING FOR A SYSTEM HAVING NON-VOLATILE MEMORY

(71) Applicant: APPLE INC., Cupertino, CA (US)

(72) Inventors: Daniel J. Post, Campbell, CA (US); Nir J. Wakrat, Los Altos, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/693,260

(22) Filed: Apr. 22, 2015

(65) Prior Publication Data

US 2015/0227460 A1    Aug. 13, 2015

Related U.S. Application Data

(62) Division of application No. 13/036,460, filed on Feb. 28, 2011, now abandoned.

(51) Int. Cl.

| | |
|---|---|
| G06F 3/06 | (2006.01) |
| G06F 12/02 | (2006.01) |
| G06F 13/16 | (2006.01) |
| G06F 12/14 | (2006.01) |
| G06F 21/71 | (2013.01) |
| G06F 21/79 | (2013.01) |

(52) U.S. Cl.
CPC .......... *G06F 12/0246* (2013.01); *G06F 3/061* (2013.01); *G06F 3/068* (2013.01); *G06F 3/0613* (2013.01); *G06F 3/0656* (2013.01); *G06F 3/0659* (2013.01); *G06F 3/0679* (2013.01); *G06F 12/1408* (2013.01); *G06F 13/1673* (2013.01); *G06F 21/71* (2013.01); *G06F 21/79* (2013.01); *G06F 2212/1052* (2013.01); *Y02B 60/1228* (2013.01)

(58) Field of Classification Search
CPC .......... G06F 2212/7203; G06F 3/0656; G06F 3/0659
See application file for complete search history.

(56) References Cited

U.S. PATENT DOCUMENTS

| | | | |
|---|---|---|---|
| 5,651,137 | A | 7/1997 | MacWilliams et al. |
| 5,724,592 | A | 3/1998 | Garner |
| 6,397,301 | B1 | 5/2002 | Quach et al. |

(Continued)

FOREIGN PATENT DOCUMENTS

| | | |
|---|---|---|
| CN | 101498994 | 8/2009 |
| EP | 0878755 | 11/1998 |

(Continued)

*Primary Examiner* — Nathan Sandler
(74) *Attorney, Agent, or Firm* — Van Court & Aldridge LLP

(57) ABSTRACT

Systems and methods are disclosed for efficient buffering for a system having non-volatile memory ("NVM"). In some embodiments, a control circuitry of a system can use heuristics to determine whether to perform buffering of one or more write commands received from a file system. In other embodiments, the control circuitry can minimize read energy and buffering overhead by efficiently re-ordering write commands in a queue along page-aligned boundaries of a buffer. In further embodiments, the control circuitry can optimally combine write commands from a buffer with write commands from a queue. After combining the commands, the control circuitry can dispatch the commands in a single transaction.

9 Claims, 9 Drawing Sheets

(56) References Cited

U.S. PATENT DOCUMENTS

| | | |
|---|---|---|
| 6,748,441 B1 | 6/2004 | Gemmell |
| 6,748,493 B1 | 6/2004 | Arroyo et al. |
| 7,305,572 B1 | 12/2007 | Burroughs et al. |
| 7,440,215 B1 | 10/2008 | Sardella et al. |
| 2002/0181311 A1 | 12/2002 | Miyauchi et al. |
| 2003/0126475 A1 | 7/2003 | Bodas |
| 2004/0186961 A1 | 9/2004 | Kimura et al. |
| 2004/0236897 A1* | 11/2004 | Cheng ............... G06F 3/0608 711/103 |
| 2005/0125703 A1 | 6/2005 | Lefurgy et al. |
| 2006/0015748 A1 | 1/2006 | Goto et al. |
| 2006/0052962 A1 | 3/2006 | Shipton et al. |
| 2006/0080553 A1 | 4/2006 | Hall |
| 2006/0082222 A1 | 4/2006 | Pincu et al. |
| 2006/0184758 A1 | 8/2006 | Satori et al. |
| 2006/0288241 A1 | 12/2006 | Felter et al. |
| 2007/0083491 A1 | 4/2007 | Walmsley et al. |
| 2007/0153585 A1 | 7/2007 | Blum |
| 2007/0211551 A1 | 9/2007 | Yogev et al. |
| 2008/0107275 A1 | 5/2008 | Asnaashari |
| 2008/0183949 A1* | 7/2008 | Ly ............... G06F 12/0246 711/103 |
| 2008/0201574 A1 | 8/2008 | Haneda |
| 2008/0209203 A1 | 8/2008 | Haneda |
| 2008/0320209 A1 | 12/2008 | Lee et al. |
| 2009/0113121 A1* | 4/2009 | Lee ............... G06F 12/0246 711/103 |
| 2009/0240873 A1 | 9/2009 | Yu et al. |
| 2009/0313416 A1 | 12/2009 | Nation |
| 2010/0031056 A1 | 2/2010 | Harada |
| 2010/0036998 A1 | 2/2010 | Ben-Rubi |
| 2010/0049905 A1 | 2/2010 | Ouchi |
| 2010/0162006 A1 | 6/2010 | Therien et al. |
| 2010/0174847 A1 | 7/2010 | Paley et al. |
| 2010/0293321 A1 | 11/2010 | Weingarten |
| 2010/0293439 A1 | 11/2010 | Flynn et al. |
| 2010/0293440 A1 | 11/2010 | Thatcher et al. |
| 2011/0173462 A1 | 7/2011 | Wakrat et al. |
| 2011/0252187 A1* | 10/2011 | Segal ............... G06F 12/0246 711/103 |
| 2012/0005409 A1 | 1/2012 | Yang |
| 2012/0023346 A1 | 1/2012 | Byom et al. |
| 2012/0023351 A1 | 1/2012 | Wakrat et al. |
| 2012/0023356 A1 | 1/2012 | Byom et al. |
| 2012/0159042 A1* | 6/2012 | Lott ............... G06F 12/1408 711/103 |
| 2012/0191982 A1 | 7/2012 | Levin |

FOREIGN PATENT DOCUMENTS

| | | |
|---|---|---|
| EP | 0955573 | 11/1999 |
| EP | 1688866 | 8/2006 |
| EP | 1818830 | 8/2007 |
| WO | 03/029951 | 4/2003 |
| WO | 2006/059698 | 6/2006 |
| WO | 2007/024396 | 3/2007 |
| WO | 2008/017624 | 2/2008 |

* cited by examiner

| | | | | | | | |
|---|---|---|---|---|---|---|---|
| $WC_0$ | $WC_4$ | $WC_8$ | | | | | |
| $WC_1$ | $WC_5$ | $WC_9$ | | | | | |
| $WC_2$ | $WC_6$ | —602 | | | | | |
| $WC_3$ | $WC_7$ | —604 | | | | | |
| 0 | 1 | 2 | 3 | 4 | 5 | 6 | 7 |

600

PAGE-ALIGNED PORTION

FIG. 6

EFFICIENT BUFFERING FOR A SYSTEM HAVING NON-VOLATILE MEMORY

CROSS-REFERENCE TO RELATED APPLICATIONS

This application is a divisional of U.S. patent application Ser. No. 13/036,460 filed Feb. 28, 2011 (now abandoned), which is incorporated by reference in its entirety.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

Because a file system of a device may perform multiple small synchronous input/outputs ("I/Os"), die parallelism cannot be achieved in some cases. This consequently may reduce system bandwidth, and increase the latency for programming the pages of a NVM.

In some scenarios, the latency for programming a NVM can be improved by buffering one or more I/Os prior to programming the I/Os to the NVM. However, in other scenarios, if I/Os can instead be directly programmed to the NVM, indiscriminate buffering of all I/Os received from a file system may actually slow down the programming process.

SUMMARY OF THE DISCLOSURE

Systems and methods are disclosed for efficient buffering of a system having non-volatile memory ("NVM"). The system can select to buffer writes where the buffering will increase system performance, and select to program writes directly to a NVM where the buffering would be a net performance burden. In some embodiments, a system can use heuristics to determine whether to perform buffering of one or more write commands received from a file system. In other embodiments, the system can minimize read energy and buffering overhead by efficiently re-ordering write commands in a queue along page-aligned boundaries of a buffer. In further embodiments, the system can optimally combine write commands from a buffer with write commands from a queue. After combining the commands, the system can dispatch the commands in a single transaction.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 6 is a graphical view of an illustrative buffer configured in accordance with various embodiments of the invention;

DETAILED DESCRIPTION OF THE DISCLOSURE

Systems and methods for efficient buffering of a system having non-volatile memory ("NVM") are provided. A control circuitry of a system can use heuristics to determine whether or not to buffer write commands received from a file system. Any suitable heuristics can be used, such as, for example, the size of a write command, the number of dispatched write command immediately preceding the write command, the number of remaining write commands saved in a queue, the amount of available space in memory, the size of a buffer, and input/output ("I/O") patterns.

In some embodiments, the control circuitry can determine whether or not to buffer a write command based on the size of command. For example, if the control circuitry determines that the write command is a relatively small command (e.g., the size of the write command is below a pre-determined threshold), the control circuitry can select a buffered path for the write command (e.g., transfer the write command to a buffer in memory). If the control circuitry instead determines that the write command is a relatively large command (e.g., the size of the write command exceeds a pre-determined threshold), the control circuitry can select a write path for the write command (e.g., direct a bus controller to dispatch the write command to a NVM).

In some embodiments, instead of automatically selecting a buffered path for small write commands, the control circuitry can use additional heuristics to determine if write commands saved in a queue can be combined into a write-multi command directly in the queue. Once the commands have been combined into the write-multi command, the control circuitry can dispatch the write-multi command directly from the queue to a NVM via a write path.

In other embodiments, in order to maximize concurrency, the control circuitry can attempt to re-order the write commands in a queue along page-aligned boundaries of a buffer. Consequently, read energy can be minimized on a subsequent read because user data is often read with the same alignments and granularity as the alignments and granularity with which the user data was programmed. In further embodiments, a control circuitry can combine buffered write commands and queue write commands into the same batch or transaction to improve system efficiency.

Figure 1:
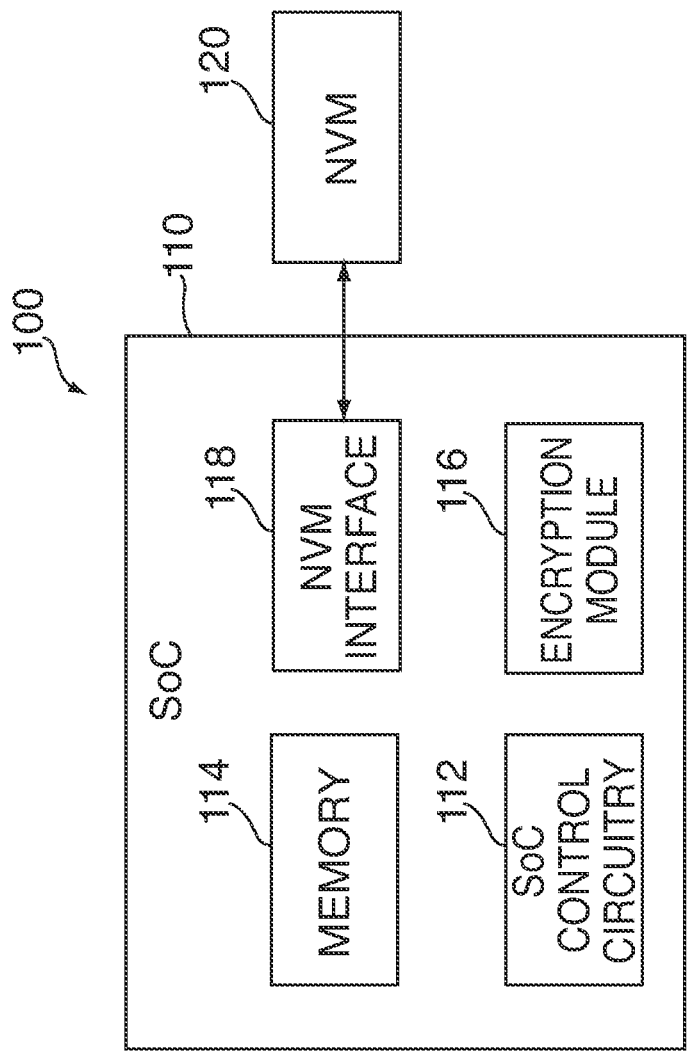
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

System-on-a-chip 110 can include SoC control circuitry 112, memory 114, encryption module 116, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

SoC control circuitry 112 can dispatch one or more commands to NVM 120. In some embodiments, SoC control circuitry 112 can include a block device driver or wrapper that can be configured to dispatch application programming interface ("API") operations to NVM 120 or a controller of NVM 120. In some embodiments, SoC control circuitry 112 can modify one or more parameters of the block device driver or wrapper in order to transfer information to NVM 120. For example, by modifying the one or more parameters, SoC control circuitry 112 can transfer information associated with commands used to access NVM 120 (e.g., read, program, erase, and/or write-multi commands).

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

In some embodiments, memory 114 can include one or more command queues (not shown in FIG. 1) for saving commands (e.g., read, write, and/or trim commands) received from a file system that have not yet been dispatched to NVM 120. The one or more command queues can be block-device level queues. For example, memory 114 can include a read queue for retaining read commands, a write queue for retaining write commands, and a trim queue for retaining trim commands. Consequently, SoC control circuitry 112 can scan one or more queues in order to select one or more commands that may be dispatched to NVM 120. After the one or more commands have been dispatched, SoC control circuitry 112 can remove those commands from the queue. Persons skilled in the art will appreciate that memory 114 may instead include one queue configured to retain all types of commands (e.g., read, write, and trim commands).

The one or more queues will generally be serviced until the queues are empty. In some embodiments, SoC control circuitry 112 can have a set of fairness rules for servicing each of the separate queues. For example, SoC control circuitry 112 may attempt to service the queues such that each of the queues is serviced at approximately the same rate as the number of commands that are currently included in the queue. The order in which the queues are serviced affects the quality of service of the system.

In some embodiments, because commands may not be able to be saved in the queues indefinitely (e.g., other threads or processes may be waiting for those I/Os to complete), memory 114 can include a buffer (not shown in FIG. 1) that can provide for longer-term storage of commands. For example, in some cases, SoC control circuitry 112 can select one or more write commands saved in a queue, and transfer the selected write commands to the buffer. After saving the write commands to the buffer, SoC control circuitry 112 can remove those write commands from the queue.

Persons skilled in the art will appreciate that the buffer in memory 114 can have any suitable size. For example, the buffer may be a relatively small buffer capable of storing less than one page of data. However, if the minimum program granularity is one page or larger, the buffer may be a relatively large buffer capable of storing one or more pages of data. For instance, the buffer may have a size of one page, one stripe, multiple stripes, a super block, or any other suitable size.

Encryption module 116 can be or may include any hardware or software, or combination thereof, configured to perform encryption and decryption based on a suitable cipher. For example, encryption module 116 can be based on the Advanced Encryption Standard ("AES"), Data Encryption Standard ("DES"), or RSA. Encryption module 116 can provide security for sensitive data, such as personal information or billing information, stored on NVM 120 or transmitted/received to/from SoC 110. Although encryption module 116 is shown in FIG. 1 as included in SoC 110, persons skilled in the art will appreciate that encryption module 116 may instead be implemented in NVM 120.

In some embodiments, encryption module 116 can encrypt and decrypt data using one or more "encryption seeds" provided by control circuitry (e.g., SoC control circuitry 112 or a controller on NVM 120), which may be required by the encryption algorithm to perform encryption or decryption. In some embodiments, and particularly for AES-based encryption modules, the encryption seeds can include a key and an initialization vector ("IV"). To recover the original unencrypted data from encrypted data, the encryption seeds used for decryption may need to be the same as the seeds originally used for encryption.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
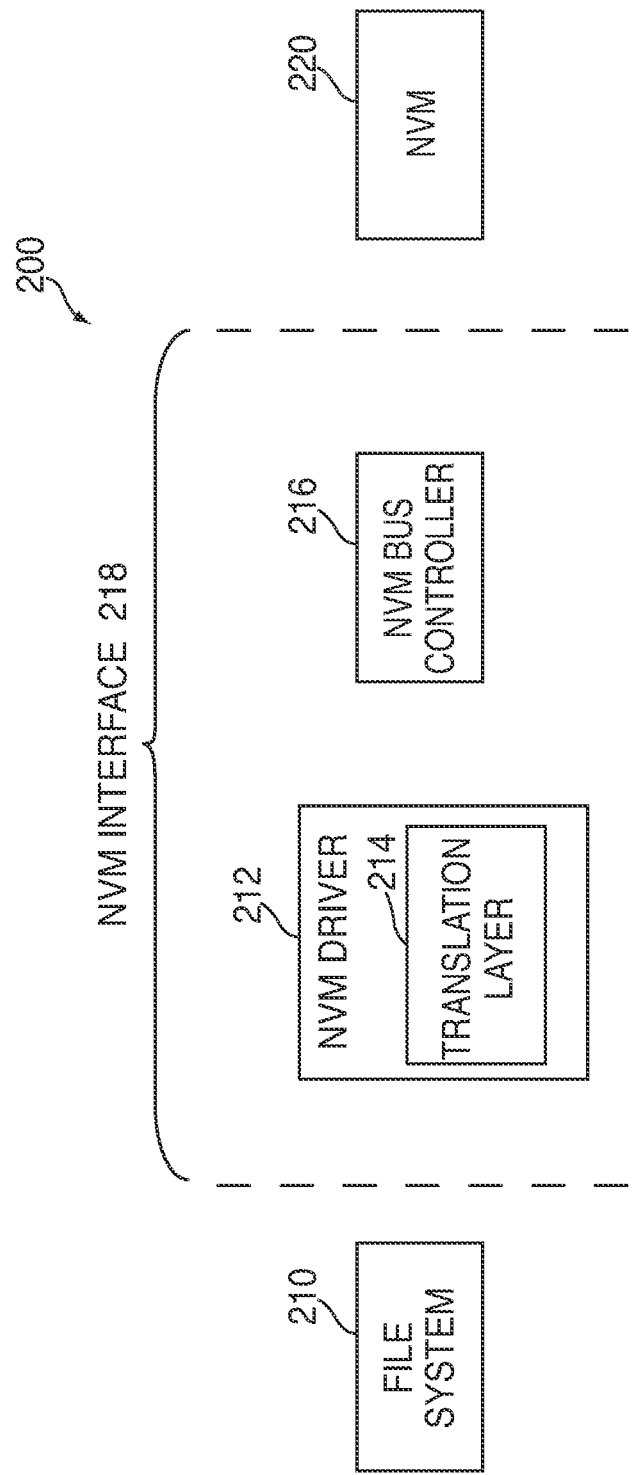

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical to physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address ("LBA") with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

In some embodiments, upon receiving a command (e.g., a write command) from file system 210, NVM interface 218 can direct NVM bus controller 216 to dispatch a command (e.g., an API operation) to NVM 220. In some embodiments, NVM interface 218 may use translation layer 214 to obtain the physical addresses of one or more memory locations of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Figure 3:
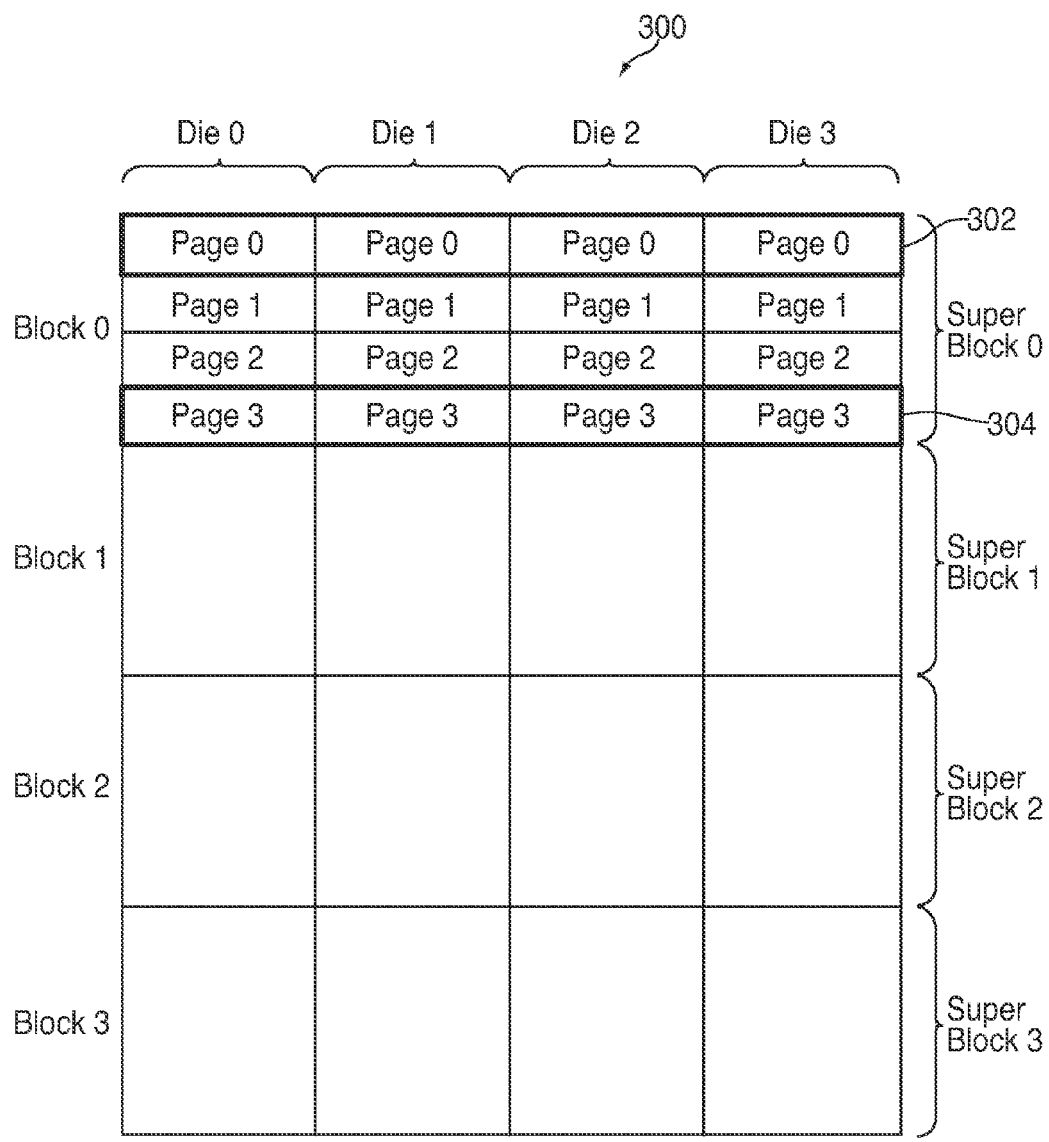
FIG. 3 is a functional view of a non-volatile memory in accordance with various embodiments of the invention.

As discussed above, a NVM (e.g., NVM 120 of FIG. 1 or NVM 220 of FIG. 2) can be organized into dies, blocks, pages, super blocks, and the like. For example, FIG. 3 shows a schematic layout of NVM 300. NVM 300 can be the same as or similar to NVM 120 (FIG. 1) or NVM 220 (FIG. 2). FIG. 3 is merely meant to illustrate the organizational layout of NVM 300 and does not indicate an actual, physical layout of the non-volatile memory. For instance, although die 0 is illustrated as being next to die 1 in FIG. 3, this is merely for illustrating the functional relationship of these dies, and in the actual, physical layout of NVM 300, these dies may or may not be located near one another.

Moreover, although a certain number of dies, blocks, and pages are shown in FIG. 3, this is merely for the purpose of illustration and one skilled in the art could appreciate that NVM 300 could include any suitable number of dies, blocks, and pages. As one illustration, each die of NVM 300 can include 4096 blocks, each block may include 64, 128, or 192 pages based on whether the block is an SLC block, 2-bit MLC block, or 3-bit MLC block. In addition, each page of NVM 300 can have any suitable size such as, for example, 2 KiB, 4 KiB, 8 KiB, or 16 KiB.

As illustrated by FIG. 3, NVM 300 can include one or more dies (i.e., integrated circuits), such as die 0, die 1, die 2, and die 3. Each die of NVM 300 may be organized into one or more "blocks". For example, dies 0-3 is illustrated as each being organized into blocks 0-3.

Each block of the dies may be organized into one or more pages. For example, block 0 of each of dies 0-3 is illustrated as being organized into pages 0-3. Each page of NVM 300 can include any suitable information. For example, the pages can include user data, metadata, or both. In some embodiments, metadata such as ECC data can be included in the pages to provide for error detection and/or correction of the information stored in NVM 300.

Over time, page sizes have increased in order to compensate for the longer time that it takes to program a NVM. That is, because memory cells of NVMs have decreased in size, more precise pulses have to be applied to memory cells of a NVM in order to program data in those cells. Accordingly, by increasing the size of pages, the same amount of user data can be programmed during any particular period of time. The net effect of this is that a user of an electronic device will not experience a reduction in the overall programming speed of a NVM.

NVM 300 can also include one or more super blocks that include one block from each die that has the same position or "block number" in the die. For example, super block 0 of NVM 300 can include block 0 of each of dies 0-3. Similarly, super block 1 of NVM 300 can include block 1 of each of dies 0-3, super block 2 of NVM 300 can include block 2 of each of dies 0-3, and so forth.

Super blocks can be formed by virtually linking or "striping" together one or more blocks. Blocks need not be in the same row of each die to be virtually linked as a super block. In fact, blocks may be chosen randomly from two or more dies to form a super block. In some embodiments, a super block can include only one block. Super blocks provide operational parallelism, thereby enabling programming, reading, and erase operations to be performed on blocks located in different dies in parallel.

In addition, pages from two or more dies may be virtually linked together to form super pages or "stripes". For instance, stripe 302 can include page 0 from block 0 of each of dies 0-3. Similarly, stripe 304 can include page 3 from block 0 of each of dies 0-3. A translation layer (e.g., translation layer 214 of FIG. 2) being implemented in an NVM interface may keep track of super blocks or stripes. Generally, the programming time can remain the same for pages that are included in a particular stripe (e.g., stripe 302 or 304).

A file system of a system (e.g., file system 210 of FIG. 2) can operate in a logical space. Thus, as discussed above, each file in the system can map to one or more LBAs. Correspondingly, the one or more LBAs can be mapped to one or more physical page addresses in the NVM.

However, when a NVM is configured to have larger pages capable of storing multiple LBAs, the file system may sometimes issue a write command that may not completely fill up a physical page in a NVM. In conventional systems, a control circuitry (e.g., control circuitry 112 of FIG. 1) can pad out the unfilled portions of a page with invalid data, and program the write command along with the invalid data to the NVM. This operation wastes space in the NVM, and may consequently increase the amount of GC that needs to be performed on the NVM.

Accordingly, in order to increasing system efficiency, a system can be configured to dispatch multiple write commands to a NVM in a single transaction.

Figure 4:
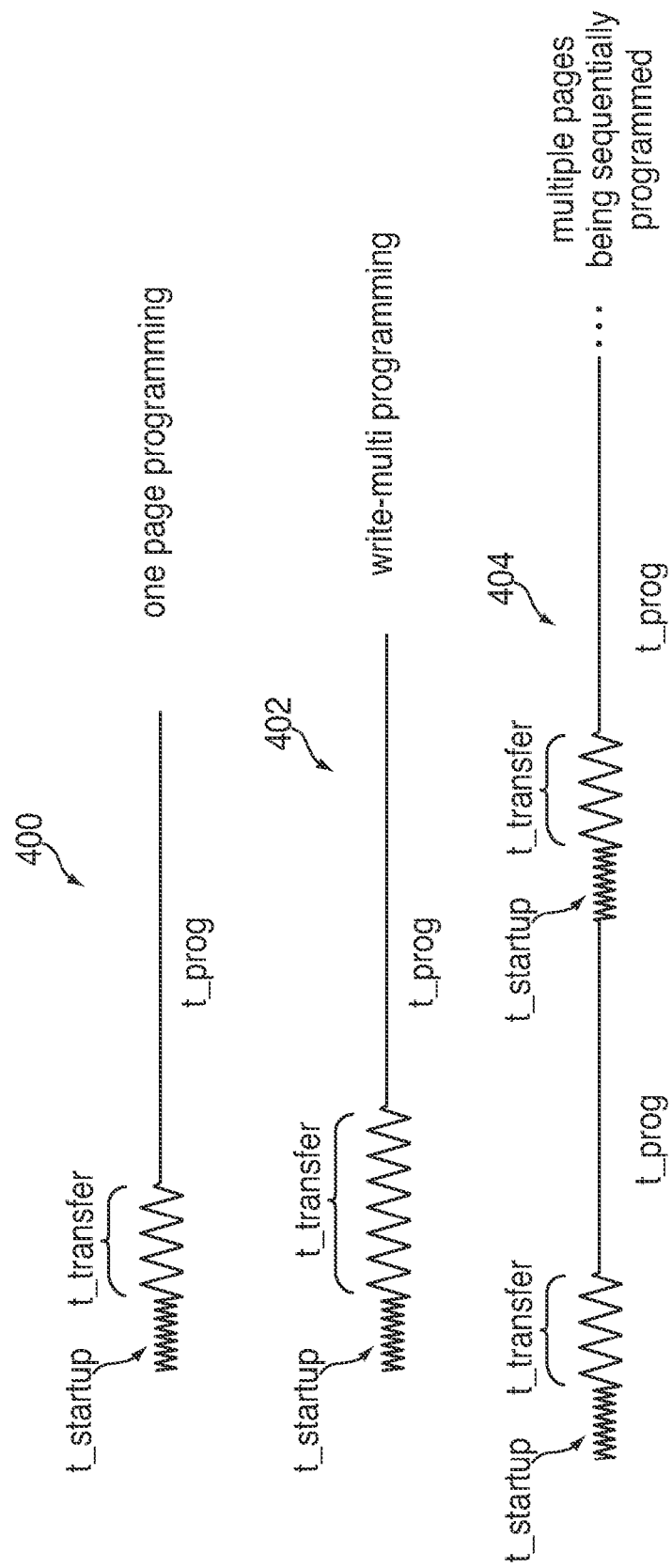
FIG. 4 is a graphical view of illustrative timing diagrams for various systems.

FIG. 4 show illustrative timing diagrams for various systems. For example, as shown in FIG. 4, the programming time (t_prog) is not substantially different if one page (as shown in timing diagram 400) or multiple pages (as shown in time diagram 402) are being programmed in a single operation (e.g., as a write-multi command). This may be particularly true if the multiple pages are included in a single stripe.

In addition, the time for startup programming (t startup) also do not vary substantially if one page or multiple pages are being programmed in a single operation. As used herein, the "time for startup programming" refers to the time that it takes to activate the NVM interface (e.g., NVM interface 218 of FIG. 2).

Moreover, under most scenarios, the time that it takes to transfer contents to a page buffer (t_transfer) is relatively short as compared to t_prog. For example, as shown in timing diagram 402, t_transfer for programming a write-multi command can still be of shorter duration as compared to t_prog. However, as shown in timing diagram 404, programming multiple pages separately is less efficient due to the combination of multiple t_progs. The efficiency of the system is especially impacted if the amount of user data that can be programmed each time is relatively small.

Consequently, to increase the amount of die programming that can be performed in parallel and the amount of user data that can be programmed in a particular I/O transaction, a control circuitry can combine multiple write commands into a single write-multi command. Persons skilled in the art will appreciate that a write-multi command can be formed using any suitable approach. For example, the control circuitry can form a write-multi command by combining a set of logical addresses, a set of counters, and a set of buffers associated with the multiple commands into an array of logical addresses, an array of counters, and an array of buffers, respectively.

After forming the write-multi command, the control circuitry can dispatch the write-multi command to a NVM (e.g., in the form of an API operation). By forming and dispatching a write-multi command, user data can be programmed more efficiently in the NVM without wasting valuable space.

Figure 5:
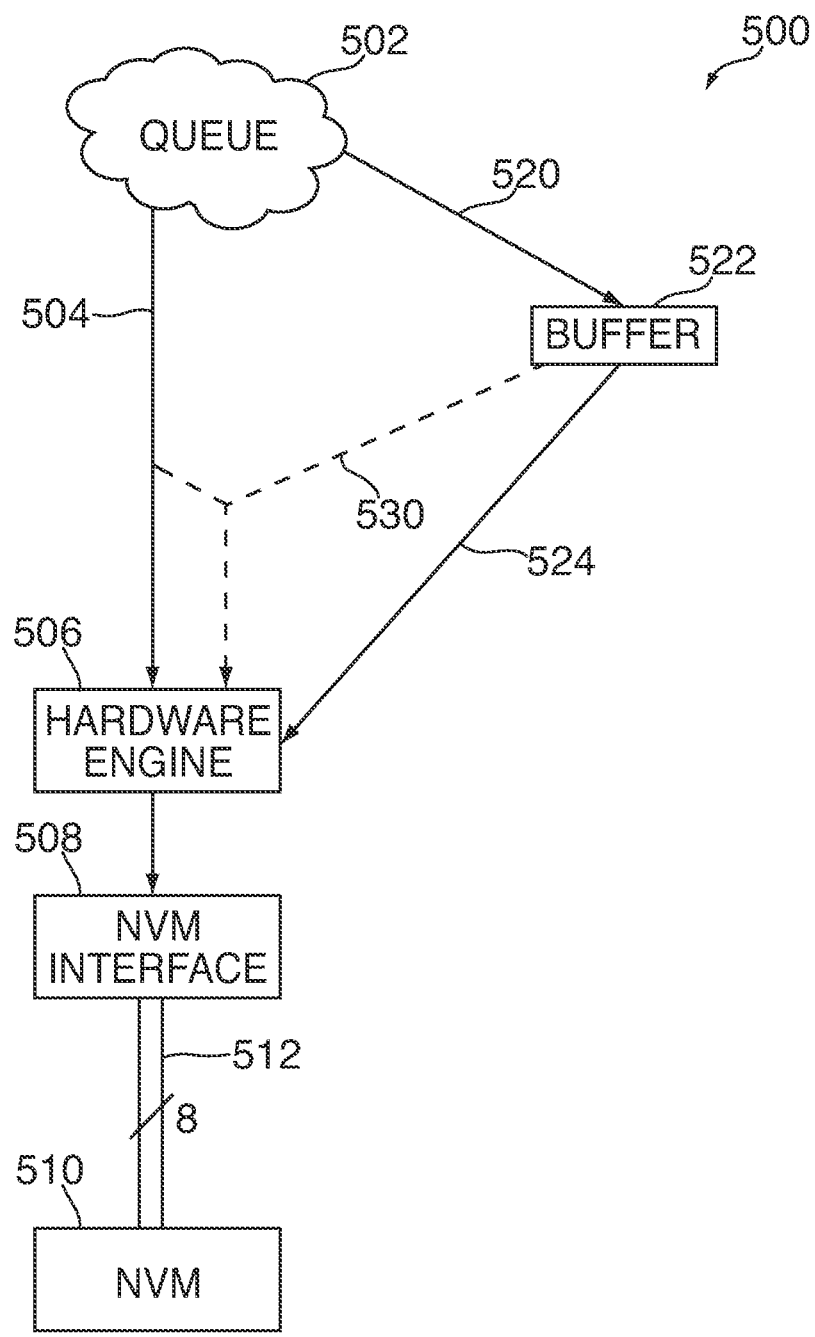
FIG. 5 is a graphical view of an illustrative programming flow for a system configured in accordance with various embodiments of the invention.

In some embodiments, the system may have several options for splitting data writes into multiple write paths. FIG. 5 shows a graphical view of an illustrative programming flow 500 for a system.

As discussed, a file system (e.g., file system 210 of FIG. 2) can issue one or more commands (e.g., read, write, and/or trim commands) that can be saved in one or more queues in the system. For example, as shown in FIG. 5, queue 502 can represent a write queue that can be configured to retain one or more write commands. However, persons skilled in the art will appreciate that the system may include additional queues for storing read and/or trim commands. Alternatively, queue 502 can be configured to store write, read, and trim commands.

In some embodiments, after a write command is received in queue 502, a control circuitry (e.g., control circuitry 112 of FIG. 1) can select one of two paths for dispatching the write command. For example, the control circuitry can select a write path (e.g., path 504) for dispatching the write command to NVM 510. NVM 510 can be the same as or similar to NVM 120 (FIG. 1), NVM 220 (FIG. 2), or NVM 300 (FIG. 3).

In some cases, by selecting path 504, the write command can be dispatched directly to hardware engine 506. Hardware engine 506 can be, for example, a direct memory access ("DMA") engine.

In some embodiments, prior to dispatching the write command to hardware engine 506, the control circuitry can encrypt the write command using an encryption module (e.g., encryption module 116 of FIG. 1). As discussed, the encryption module can encrypt the write command using any suitable encryption standard such as, for example, AES, DES, or RSA.

Subsequently, the control circuitry can pass the write command to NVM interface 508. NVM interface 508 can be the same or substantially similar to NVM interface 218 of FIG. 2. Once NVM interface 508 receives the write command, a NVM bus controller (e.g., NVM bus controller 216 of FIG. 2) can be directed to dispatch the write command to NVM 510 across bus 512.

In some cases, instead of selecting path 504, the control circuitry can select a buffered path (e.g., path 520) for a particular write command. By selecting path 520, the control circuitry can transfer the write command from queue 502 to buffer 522. As discussed above, buffer 522 can be stored in volatile memory (e.g., memory 114 of FIG. 1), and can be configured to store any suitable number of write commands.

By storing one or more write commands in buffer 522, the control circuitry can wait to receive additional write commands from the file system before directing a bus controller to concurrently dispatch multiple commands to NVM 510 via path 524. For example, the multiple commands can be combined as a write-multi command, which can then be dispatched to NVM 510.

In some embodiments, the control circuitry can direct an encryption module to encrypt the write command before the write command is transferred to buffer 522. After encrypting the write command, the control circuitry can store the encrypted write command in buffer 522.

In other embodiments, the control circuitry can transfer an unencrypted write command to buffer 522. In such embodiments, however, the control circuitry may need to copy one or more encryption seeds (e.g., one or more keys and IVs) to volatile memory (e.g., memory 114 of FIG. 1). Then, when the write command is ready to be dispatched from buffer 522, the control circuitry can direct an encryption module to use the stored encryption seeds to encrypt the write command. Consequently, for such a configuration, buffer 522 may be associated with unique encryption characteristics (e.g., a fixed set of encryption seeds).

In order to retain system coherency, one or more "side-band signals" may be issued by an application, operating system, or file system of a system. As used herein, "side-band signals" can refer to any suitable signal that may be generated by a cache algorithm of an application, operating system, or file system to maintain coherency. For example, one type of side-band signal may be a synchronized cache signal, which may be generated by one or more applications in the system. Another side-band signal may be a force unit access ("FUA") signal, which can be generated by HFS+.

In response to receiving one or more of these side-band signals, the control circuitry can direct a bus controller to flush the buffer. That is, the control circuitry can direct the bus controller to dispatch all of the commands currently stored in the buffer to the NVM via path 524.

Because path 520 involves an extra step of copying a write command from queue 502 to buffer 522, additional traffic may be generated in the system. As a result, in some scenarios, path 520 may be less efficient as compared to path 504. For example, if the transferred command is a large command, it may be more efficient to directly program the command to NVM 510 via path 504.

On the other hand, if the control circuitry indiscriminately selects path 504 for dispatching all commands (including small commands), system performance may also decrease. Accordingly, the control circuitry may need to apply one or more heuristics to select a path that is best suited for dispatching a particular write command.

One of the heuristics that may be used is the size of a write command. Based at least in part on the size of the write command, the control circuitry can determine whether or not to buffer a write command.

For example, the control circuitry can first determine the size of a write command that is saved in queue 502. The control circuitry can then determine if the size of the write command is below a pre-determined threshold. In response to determining that the size of the write command is below the pre-determined threshold (e.g., the write command is a relatively small write command), the control circuitry can determine to perform buffering of the write command.

Consequently, the control circuitry can transfer the write command from queue 502 to buffer 522 via path 520. Once the write command has been stored in buffer 522, the command can be combined with other write commands at a later time.

If the control circuitry instead determines that the size of the write command is above the pre-determined threshold (e.g., the write command is a relatively large write command), the control circuitry can determine not to perform buffering of the write command. As a result, the control circuitry can direct a bus controller to dispatch the write command from queue 502 to NVM 510 via path 504.

Accordingly, by selecting a path based on the size of a write command, the control circuitry can reduce the total required bandwidth for executing write commands from an overall system perspective.

In other embodiments, in addition to the size of a write command, the control circuitry can use other heuristics to determine which of path 504 or path 520 to select. For example, the control circuitry can use one or more heuristics to determine if system efficiency can be improved by combining multiple write commands into a write-multi command directly in queue 502. In particular, once the write commands have been combined into the write-multi command, the write-multi command can be dispatched directly from queue 502 via path 504.

One of the heuristics that can be used is the number of write commands saved in queue 502. For instance, the control circuitry can determine whether the number of write commands saved in queue 502 exceeds a pre-determined number. In response to determining that the number of write commands exceeds the pre-determined number, the control circuitry can combine the write commands into a write-multi command, and can direct a bus controller to dispatch the write-multi command from queue 502 to NVM 510. This way, the control circuitry can gain the benefits of concurrently dispatching multiple write commands, while also avoiding the extra step of copying a write command to buffer 522.

Another heuristic that may be used is I/O patterns. For example, the control circuitry can assume that I/O generally arrive in batches. For instance, during a particular period of time, the control circuitry may be more likely to receive a burst of read commands or write commands rather than write commands interspersed with read commands. Consequently, if the control circuitry has already received a series of sequential writes, the control circuitry may expect to receive additional sequential writes in the near future.

Under such an assumption, the control circuitry can determine whether a set of the most recently received write commands in queue 502 is sequential. In response to determining that the set of the most recently received write commands is sequential, the control circuitry can wait to receive additional write commands in queue 502.

Once the control circuitry receives those additional write commands, the control circuitry can combine the additional write commands with the set of the most recently received commands into a write-multi command. The control circuitry can then direct a bus controller to dispatch the write-multi command from queue 502 to NVM 510. Consequently, the control circuitry can bypass buffer 522 for sequential write commands.

In some embodiments, while the control circuitry is waiting to receive additional write commands in queue 502, the control circuitry can instead service a read queue and/or a trim queue stored in memory. As such, the control circuitry can ignore existing fairness rules, and allow write commands to stack up in queue 502.

As another example, the control circuitry can determine whether or not to buffer a small write command based on the number of dispatched write commands immediately preceding the write command and/or the amount of time that has elapsed since the last dispatched write command. That is, based on an observation of past access patterns, the control circuitry can determine that additional write commands may likely arrive in the near future. Consequently, it may be more efficient to hold on to a small write command in queue 502, and wait for additional write commands.

For instance, if the control circuitry determines that the number of dispatched write commands immediately preceding the write command exceeds a pre-determined number, the control circuitry can wait to receive one or more additional write commands in queue 502. Similarly, the control circuitry may wait to receive additional write commands if the amount of time that has elapsed since the last dispatched write command is less than a pre-determined time period (e.g., a few milliseconds).

Once the control circuitry receives one or more additional write commands in queue 502, the control circuitry can combine the additional write commands with the small write command into a write-multi command. The control circuitry can then direct a bus controller to dispatch the write-multi command from queue 502 to NVM 510.

In the examples discussed above, persons skilled in the art will appreciate that the control circuitry can transfer one or more write commands from queue 502 to buffer 522 after a period of time has elapsed (e.g., a few milliseconds). That is, if the control circuitry does not actually receive the expected write commands, the control circuitry can transfer the small write command to buffer 522.

As yet another example, the control circuitry can determine whether or not to buffer a small write command based on the number of remaining write commands saved in queue 502. For instance, if queue 502 only has a single write command or a small number of write commands, the control circuitry can transfer the small write command to buffer 522.

As a further example, the control circuitry can determine whether to perform buffering based at least in part on the amount of available space in memory. For instance, if the amount of available space in memory is below a pre-determined threshold, the control circuitry can select path 504 and bypass buffering. On the other hand, if the amount of available space is above the pre-determined threshold, the control circuitry can select path 520, and buffer a small write command.

As yet a further example, the control circuitry may use past performance of the I/O scheduling algorithm to determine whether or not to buffer. For instance, the control circuitry can maintain a scorecard of past performance of the scheduling algorithm, which can include the success rate of past buffering decisions. If the control circuitry determines that the success rate is relatively low, the control circuitry can adapt the heuristics used in determining whether or not to buffer.

As another example, the control circuitry can determine whether or not to buffer based on the size of the buffer, or, particularly, the size of the buffer relative to the size of a write command. For example, if the size of the write command is the same as or larger than the size of buffer 522, the control circuitry can determine not to transfer the write command to buffer 522, and instead select to dispatch the write command directly to NVM 510 via path 504.

If, however, the size of the buffer is greater than the size of the write command, the control circuitry can apply one or more algorithms in order to reduce fragmentation across dies for a particular write span. In particular, an assumption can be made that user data is generally read from a NVM with the same granularity as the granularity with which the user data was programmed (e.g., along similar boundaries). For example, a system may save a text document to a NVM. Subsequently, the system will likely load the entire document as well. As another example, when a system programs a database in a NVM, the database is programmed using small, random updates. Likewise, at a later time, the database will likely be accessed using random reads. As such, the system can expect that user data associated with a sequence of small write commands will be read simultaneously.

Conventionally, a system may separately program each write command to a NVM. As a result, the user data associated with the write commands may be split among multiple dies, which can increase the energy (e.g., the overall power consumption) that it will take to read the user data at a later time. This is because each die needs to be activated in order to read the user data.

Accordingly, in order to maximize concurrency (e.g., minimize channel doubling) and minimize read energy, the control circuitry can attempt to re-order the write commands in a queue along page-aligned boundaries of a buffer. In particular, the control circuitry can attempt to select one or more commands from a queue in order to fill a buffer along one or more page-aligned boundaries.

Thus, under such a scenario, the system may take page alignment into consideration when storing write commands into a buffer. For example, as shown in FIG. 6, buffer 600 includes 8 page-aligned portions (e.g., page-aligned portions 0-7), where each page-aligned portion includes space to hold four LBAs. Each page-aligned portion of buffer 600 may be configured to store the same amount of data as a page of a NVM (e.g., NVM 300 of FIG. 3 or NVM 510 of FIG. 5). Persons skilled in the art will appreciate that buffer 600 may include any suitable number of page-aligned portions.

For example, as shown, page-aligned portions 0 and 1 of buffer 600 have been completely filled with write commands, and page-aligned portion 2 of buffer 600 has only been partially filled. In particular, write commands 0-3 are stored in page-aligned portion 0, write commands 4-7 are stored in page-aligned portion 1, and write commands 8 and 9 are stored in page-aligned portion 2. The remaining portions of buffer 600 are empty.

Based on this information, the control circuitry can determine that the write commands stored in buffer 600 are not currently aligned with at least one page boundary (e.g., page-aligned portion 2 has not been completely filled). In response to determining that the write commands are not aligned in buffer 600, the control circuitry can detect a fill size that is needed to fill buffer 600 to at least one page boundary. For page-aligned portion 2, for instance, the control circuitry can determine that the fill size is the size of two LBAs (e.g., sections 602 and 604).

The control circuitry can then determine if there is at least one write command in a queue (e.g., queue 502 of FIG. 5) that has a size equal to the fill size. For example, for page-aligned portion 2 of buffer 600, the control circuitry can select one write command with a LBA size of two or two write commands each with a LBA size of one. Persons skilled in the art will appreciate that any suitable algorithm can be used to determine if there is at least one write command in a queue that has a size equal to the fill size such as, for example, a best-fit algorithm. Persons skilled in the art will also appreciate that if there are multiple write commands in a queue that satisfy the fill size, the control circuitry can use one or more of the heuristics discussed above to select write command(s) for filling the buffer.

Thus, if the control circuitry determines that there is at least one write command that has a size equal to the fill size, the control circuitry can transfer the at least one write command from the queue to buffer 600. In the example shown in FIG. 6, for instance, the control circuitry can completely fill page-aligned portion 2 of buffer 600 (e.g., fill sections 602 and 604 with one or more write commands).

Once buffer 600 has been filled to at least one page-aligned portion (e.g., the write commands stored in buffer 600 is aligned with page-aligned portion 2), the control circuitry can combine the commands into a write-multi command. After generating the write-multi command, the control circuitry can direct a bus controller to dispatch the write-multi command from buffer 600 to a NVM.

In some embodiments, if the write commands stored in buffer 600 are encrypted commands, the control circuitry can first direct an encryption module to encrypt the at least one command prior to transferring the command from a queue to buffer 600. After the command has been encrypted, the control circuitry can store the at least one encrypted command in buffer 600.

As discussed above, the control circuitry may receive one or more side-band signals (e.g., synchronized cache or FUA signals) before a page-aligned portion of buffer 600 has been completely filled. In such a scenario, the control circuitry can fill buffer 600 to the end of the page-aligned portion (e.g., page-aligned portion 2) with invalid data (e.g., fill sections 602 and 604 with invalid data). The control circuitry can then combine the write commands stored in buffer 600 with the invalid data into a write-multi command, and direct the bus controller to dispatch the write-multi command from buffer 600 to the NVM.

Accordingly, by optimally re-ordering write commands in a queue and fitting one or more of these write commands into page-aligned portions in a buffer, the system can minimize read energy on the read path, minimize buffering overhead, and reduce fragmentation in a NVM.

Referring back to FIG. 5, instead of selecting path 504 or path 520, a control circuitry can combine buffered write commands and queue write commands into the same batch or transaction (e.g., as a write-multi command) via path 530. For example, the control circuitry can select at least a first write command from queue 502 and at least a second write command from buffer 522, where the first and second write commands may be selected to minimize page crossings in NVM 510. After selecting the first and second write commands, the control circuitry can combine the commands to form a write-multi command. Finally, the control circuitry can direct a bus controller to dispatch the write-multi command to the NVM via path 530.

In some cases, in combining write commands from a buffer with write commands from a queue, the control circuitry may need to combine multiple types of encryption characteristics in a single transaction. For instance, the control circuitry can apply at least a first encryption seed to the one or more write commands selected from queue 502. In addition, if write commands stored in buffer 522 are unencrypted commands, the control circuitry can retrieve one or more encryption seeds from memory (e.g., memory 114 of FIG. 1). After retrieving the one or more encryption seeds, the control circuitry can apply the one or more encryption seeds to the one or more write commands selected from buffer 522. The control circuitry can then combine the first and second encrypted write commands into a write-multi command, and dispatch the write-multi command to NVM 510.

Figure 7A:
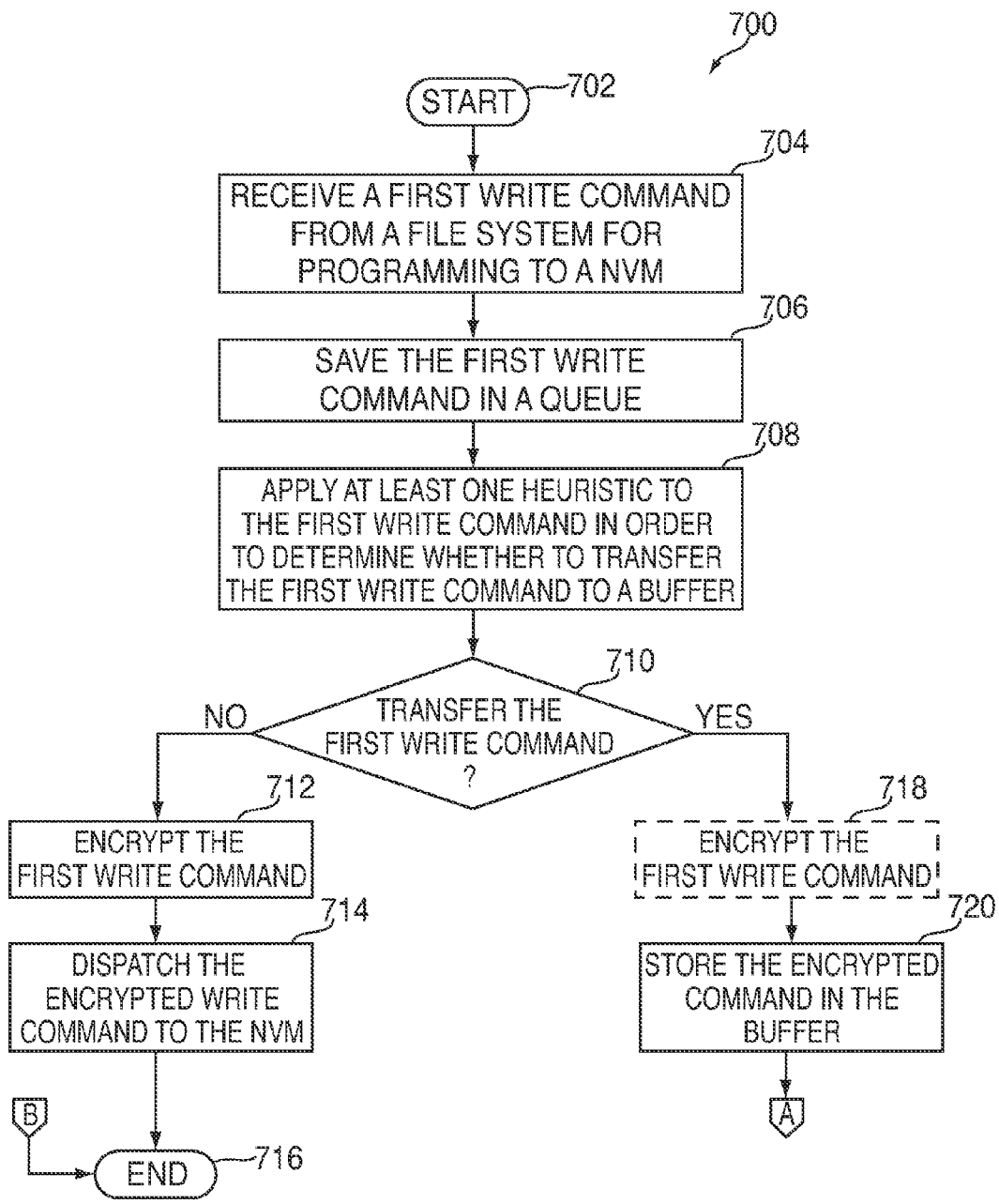
FIGS. 7A and 7B are flowcharts of an illustrative process for efficient buffering in a non-volatile memory in accordance with various embodiments of the invention.
Figure 7B:
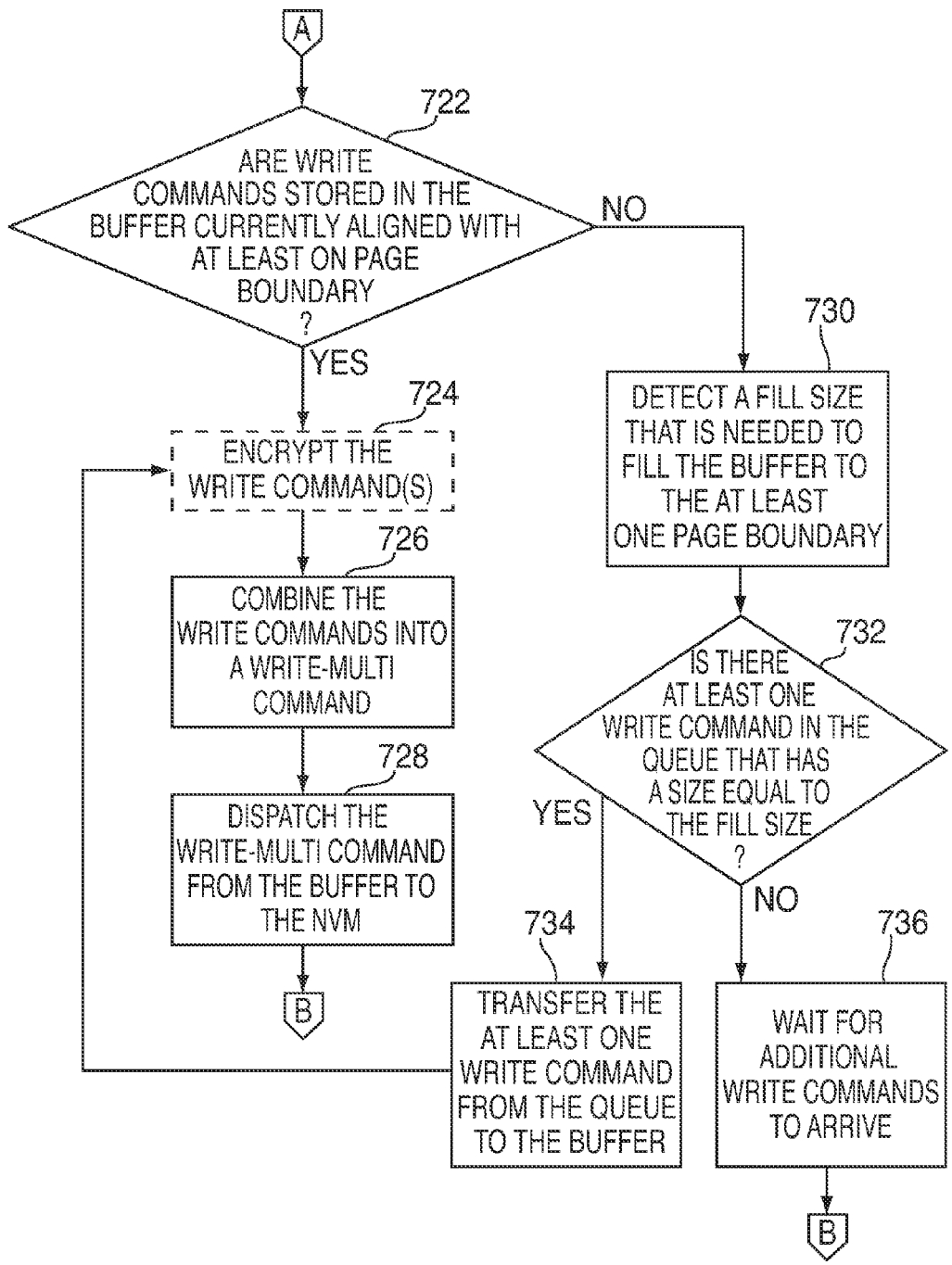
Figure 8:
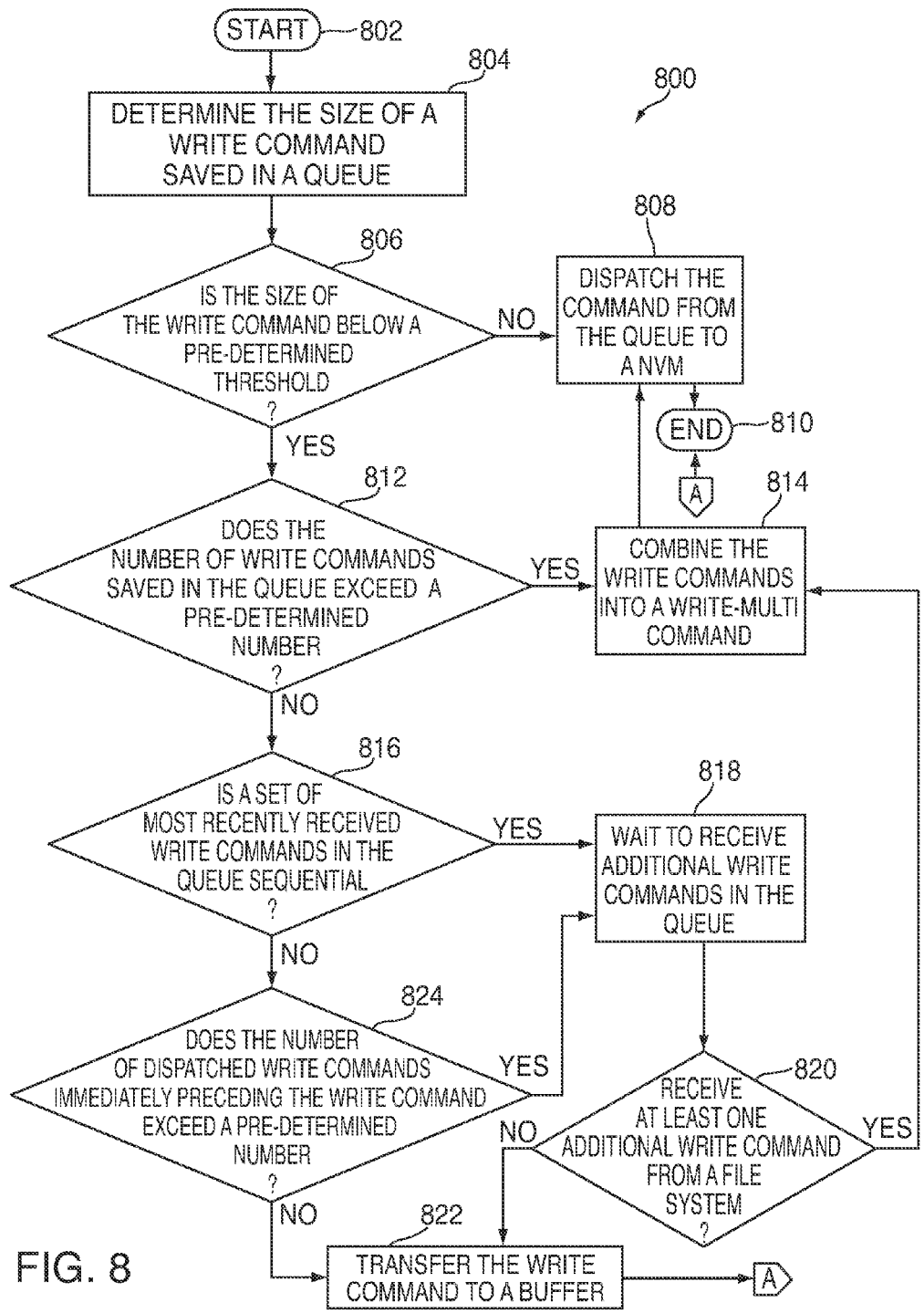
FIG. 8 is a flowchart of an illustrative process for determining whether to buffer in a non-volatile memory in accordance with various embodiments of the invention.

Referring now to FIGS. 7A-7B and 8, flowcharts of illustrative processes are shown in accordance with various embodiments of the invention. These processes may be executed by one or more components in a system (e.g., electronic device 100 of FIG. 1 or electronic device 200 of FIG. 2). For example, at least some of the steps in the processes of FIGS. 7A-7B and 8 may be performed by control circuitry (e.g., SoC control circuitry 112 of FIG. 1). Persons skilled in the art will appreciate that one or more of the steps may be performed by a NVM interface (e.g., NVM interface 118 of FIG. 1 or NVM interface 218 of FIG. 2). Dashed boxes are meant to illustrate steps that may or may not be performed based on the configuration of the system.

Turning first to FIGS. 7A and 7B, process 700 is shown for efficient buffering in a NVM (e.g., NVM 120 of FIG. 1, NVM 220 of FIG. 2, NVM 300 of FIG. 3, or NVM 510 of FIG. 5). Process 700 may begin at step 702, and at step 704, the control circuitry can receive a first write command from a file system (e.g., file system 210 of FIG. 2) for programming to a NVM.

At step 706, the control circuitry can save the first write command in a queue (e.g., queue 502 of FIG. 5). Continuing to step 708, the control circuitry can apply one or more heuristics to the first write command in order to determine whether to transfer the first write command to a buffer (e.g., buffer 522 of FIG. 5 or buffer 600 of FIG. 6). That is, the control circuitry can determine whether to perform buffering of the first write command.

If, at step 710, the control circuitry determines not to transfer the first write command, process 700 may move to step 712. At step 712, the control circuitry can direct an encryption module (e.g., encryption module 116 of FIG. 1) to encrypt the first write command. Then, at step 714, the control circuitry can direct a bus controller (e.g., NVM bus controller 216 of FIG. 2) to dispatch the encrypted write command to the NVM (e.g., via path 504 of FIG. 5). For example, the control circuitry may be configured to direct the bus controller to dispatch the encrypted write command to a hardware engine (e.g., hardware engine 506 of FIG. 5). Process 700 may then end at step 716.

If, at step 710, the control circuitry instead determines to transfer the first write command, process 700 may move to step 718 or, alternatively, to step 720. In particular, if the system is configured such that commands are encrypted prior to storage in a buffer, then, at step 718, the control circuitry can direct an encryption module to encrypt the first write command. On the other hand, if the system is configured such that unencrypted commands are stored in the buffer, process 700 may directly move to step 720. In such a configuration, the control circuitry can also copy one or more encryption seeds to memory (e.g., memory 114 of FIG. 1). Thus, at step 720, the control circuitry can store either the encrypted command or the unencrypted command in the buffer (e.g., via path 520 of FIG. 5).

Continuing to step 722, the control circuitry can determine if the write commands stored in the buffer are currently aligned with at least one page boundary. If, at step 722, the control circuitry determines that the write commands stored in the buffer are currently aligned with at least one page boundary, process 700 may move to step 724 or step 726. That is, if unencrypted commands are stored in the buffer, at step 724, the control circuitry can direct an encryption module to encrypt the write commands using one or more stored encryption seeds. If, however, encrypted commands are stored in the buffer, process 700 may move directly to step 726.

At step 726, the control circuitry can combine the write commands in the buffer into a write-multi command. Then, at step 728, the control circuitry can direct a bus controller to dispatch the write-multi command from the buffer to the NVM (e.g., via path 524 of FIG. 5). Process 700 may then end at step 716.

If, at step 722, the control circuitry instead determines that the write commands stored in the buffer are not currently aligned with at least one page boundary, process 700 may move to step 730. At step 730, the control circuitry can detect a fill size that is needed to fill the buffer to the at least one page boundary.

Continuing to step 732, the control circuitry can determine if there is at least one write command in the queue that has a size equal to the fill size. If at step 732, the control circuitry determines that there is at least one write command that has a size equal to the fill size, process 700 may move to step 734.

At step 734, the control circuitry can transfer the at least one write command from the queue to the buffer. Process 700 may then return to step 724 or step 726 (e.g., depending on whether or not the write commands in the buffer are encrypted).

If, at step 732, the control circuitry instead determines that there is not at least one write command in the queue that has a size equal to the fill size, process 700 may move to step 736. At step 736, the control circuitry can wait for additional write commands to arrive (e.g., wait to receive additional write commands from a file system). Process 700 may then end at step 716.

Turning now to FIG. 8, process 800 is shown for determining whether or not to buffer in a NVM (e.g., NVM 120 of FIG. 1, NVM 220 of FIG. 2, NVM 300 of FIG. 3, or NVM 510 of FIG. 5). In some embodiments, process 800 may represent a more detailed view of the applying at least one heuristic step 708 and the determining whether to transfer step 710 of process 700 (FIG. 7).

Process 800 may begin at step 802, and at step 804, the control circuitry can determine the size of a write command saved in a queue (e.g., queue 502 of FIG. 5).

Then, at step 806, the control circuitry can determine whether the size of the write command is below a pre-determined threshold. If, at step 806, the control circuitry determines that the size of the write command is not below the pre-determined threshold (e.g., the write command is a large write command), process 800 may move to step 808.

At step 808, the control circuitry can direct a bus controller to dispatch the write command from the queue to a NVM (e.g., via path 504 of FIG. 5). Process 800 may then end at step 810.

If, at step 806, the control circuitry instead determines that the size of the write command is below a pre-determined threshold (e.g., the write command is a small write command), process 800 may move to step 812.

At step 812, the control circuitry can determine whether the number of write commands saved in the queue exceeds a pre-determined number. If, at step 812, the control circuitry determines that the number of write commands saved in the queue exceeds the pre-determined number, process 800 may move to step 814.

At step 814, the control circuitry can combine the write commands into a write-multi command.

Process 800 may then move to step 808, where the write-multi command can be dispatched from the queue to the NVM.

If, at step 812, the control circuitry instead determines that the number of write commands saved in the queue does not exceed the pre-determined number, process 800 may move to step 816.

At step 816, the control circuitry can determine whether a set of most recently received write commands in the queue is sequential. If, at step 816, the control circuitry determines that the set of most recently received write commands is sequential, process 800 may move to step 818.

At step 818, the control circuitry can wait to receive additional write commands in the queue. Then, at step 820, the control circuitry can determine if at least one additional write command has been received from a file system (e.g., file system 210 of FIG. 2). For example, the control circuitry can make this determination after a short period of time (e.g., a few milliseconds).

If, at step 820, the control circuitry determines that it has received at least one additional write command from the file system, process 800 may move to step 814, where the write commands can be combined into a write-multi command.

If, at step 820, the control circuitry instead determines that it has not received at least one additional write command from the file system, process 800 may move to step 822. At step 822, the control circuitry can transfer the write command to a buffer (e.g., via path 520 of FIG. 5). Process 800 may then end at step 810.

If, at step 816, the control circuitry instead determines that a set of most recently received write commands in the queue are not sequential, process 800 may move to step 824. At step 824, the control circuitry can determine whether the number of dispatched write commands immediately preceding the write command exceeds a pre-determined number.

If, at step 824, the control circuitry determines that the number of dispatched write commands exceeds a pre-determined number, process 800 may move to step 818, where the control circuitry can wait to receive additional commands in the queue. If, at step 824, the control circuitry instead determines that the number of dispatched write commands does not exceed a pre-determined number, process 800 may move to step 822, where the control circuitry can transfer the write command to the buffer.

It should be understood that processes 700 and 800 of FIGS. 7A-7B and 8 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for combining write commands for dispatch to a non-volatile memory ("NVM"), the method implemented in a system comprising a volatile memory buffer, the method comprising:
   selecting a first write command from a volatile memory queue;
   transferring the first write command to the volatile memory buffer;
   selecting a second write command from the volatile memory queue for inclusion in the volatile memory buffer, wherein the NVM comprises a plurality of pages and the second write command is selected to minimize cases where the first and second write commands cross at least one page boundary in the NVM;
   transferring the second write command to the volatile memory buffer;
   combining the first and second write commands to form a write-multi command in the volatile memory buffer; and
   dispatching, from the volatile memory buffer, the write-multi command to the NVM.

2. The method of claim 1, wherein the combining the at least the first and second write commands further comprises applying at least a first encryption seed to the at least the first write command.

3. The method of claim 2, wherein the at least the second write command is unencrypted.

4. The method of claim 3, wherein the combining the at least the first and second write commands further comprises:
   retrieving at least a second encryption seed from volatile memory; and applying the at least the second encryption seed to the at least the second write command.

5. A system comprising:
   a non-volatile memory ("NVM") comprising a plurality of pages;
   a bus controller operative to communicate with the NVM;
   volatile memory comprising a queue and a buffer, wherein the queue comprises at least one write command that has not been transferred to the buffer, and wherein the buffer comprises a set of write commands including only write commands that have been transferred from the queue; and
   control circuitry operative to:
      determine if the set of write commands stored in the buffer is currently aligned with at least one page boundary;
      in response to determining that the set of write commands stored in the buffer is not currently aligned with the at least one page boundary, detect a fill size that is needed to fill the buffer to the at least one page boundary;
      determine if there is at least one write command in the queue that has a size equal to the fill size;
      in response to determining that there is at least one write command in the queue that has a size equal to the fill size, transfer the at least one write command from the queue to the buffer; and
      in response to determining that the set of write commands stored in the buffer is currently aligned with the at least one page boundary, combine the set of write commands into a write-multi command, and direct the bus controller to dispatch the write-multi command from the buffer to the NVM.

6. The system of claim 5, wherein the control circuitry is operative to use a best-fit algorithm to determine if there is at least one write command in the queue that has a size equal to the fill size.

7. The system of claim 5, wherein the control circuitry is operative to:
   receive at least one side-band signal;
   fill the buffer to the an end of at least one page-aligned portion with invalid data;
   combine the set of write commands with the invalid data into a write-multi command; and
   direct the bus controller to dispatch the write-multi command from the buffer to the NVM.

8. The system of claim 5, wherein the set of write commands comprises encrypted commands.

9. The system of claim 8, further comprising an encryption module, and wherein in response to determining that there is at least one command in the queue with a size equal to the fill size, the control circuitry is operative to:
   direct the encryption module to encrypt the at least one command; and
   store the at least one encrypted command in the buffer.

* * * * *